United States Patent
Muller

(10) Patent No.: US 9,560,575 B1
(45) Date of Patent: Jan. 31, 2017

(54) VEHICULAR SAFETY SYSTEM

(71) Applicant: Ross Muller, Gautier, MA (US)

(72) Inventor: Ross Muller, Gautier, MA (US)

(*) Notice: Subject to any disclaimer, the term of this patent is extended or adjusted under 35 U.S.C. 154(b) by 0 days.

(21) Appl. No.: 14/845,881

(22) Filed: Sep. 4, 2015

(51) Int. Cl.
| | |
|---|---|
| *H04M 1/04* | (2006.01) |
| *H04W 48/04* | (2009.01) |
| *H04W 4/00* | (2009.01) |
| *H04W 4/04* | (2009.01) |

(52) U.S. Cl.
CPC ............ *H04W 48/04* (2013.01); *H04W 4/003* (2013.01); *H04W 4/04* (2013.01)

(58) Field of Classification Search
CPC .... H04M 1/0214; H04M 1/23; H04M 1/0247; H04M 1/0237; H04B 1/3833
USPC ........ 455/550.1, 572, 575.1, 573, 575.9, 95, 455/99, 100; 439/131, 504
See application file for complete search history.

(56) References Cited

U.S. PATENT DOCUMENTS

| | | | |
|---|---|---|---|
| 6,690,940 B1 | 2/2004 | Brown et al. | |
| 7,123,874 B1 | 10/2006 | Brennan | |
| D625,689 S | 10/2010 | Chan | |
| D655,676 S * | 3/2012 | Au | D13/144 |
| 8,200,291 B2 | 6/2012 | Steinmeitz et al. | |
| 8,336,664 B2 | 12/2012 | Wallace et al. | |
| 2007/0101426 A1 | 5/2007 | Lee et al. | |
| 2011/0063098 A1 | 3/2011 | Fischer et al. | |
| 2011/0263301 A1 | 10/2011 | Chang | |
| 2014/0062686 A1* | 3/2014 | Florio | B60R 25/102 340/426.18 |
| 2014/0328076 A1* | 11/2014 | Firman, II | H01R 13/6675 362/511 |
| 2015/0105967 A1* | 4/2015 | Skipp | G07C 5/008 701/31.4 |

FOREIGN PATENT DOCUMENTS

WO  WO2011033365  3/2011

* cited by examiner

Primary Examiner — Cong Tran

(57) ABSTRACT

A vehicular safety system includes a vehicle that has a power outlet. An electronic device is provided and the electronic device may be in communication with an extrinsic communication network. A locking unit is removably positioned within the power outlet such that the locking unit determines when the vehicle is turned on. The locking unit is in communication with the electronic device such that the locking unit disables the electronic device when the vehicle is turned on while the electronic device is within the vehicle.

9 Claims, 4 Drawing Sheets

VEHICULAR SAFETY SYSTEM

BACKGROUND OF THE DISCLOSURE

Field of the Disclosure

The disclosure relates to safety devices and more particularly pertains to a new safety device for preventing texting while driving.

SUMMARY OF THE DISCLOSURE

An embodiment of the disclosure meets the needs presented above by generally comprising a vehicle that has a power outlet. An electronic device is provided and the electronic device may be in communication with an extrinsic communication network. A locking unit is removably positioned within the power outlet such that the locking unit determines when the vehicle is turned on. The locking unit is in communication with the electronic device such that the locking unit disables the electronic device when the vehicle is turned on while the electronic device is within the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
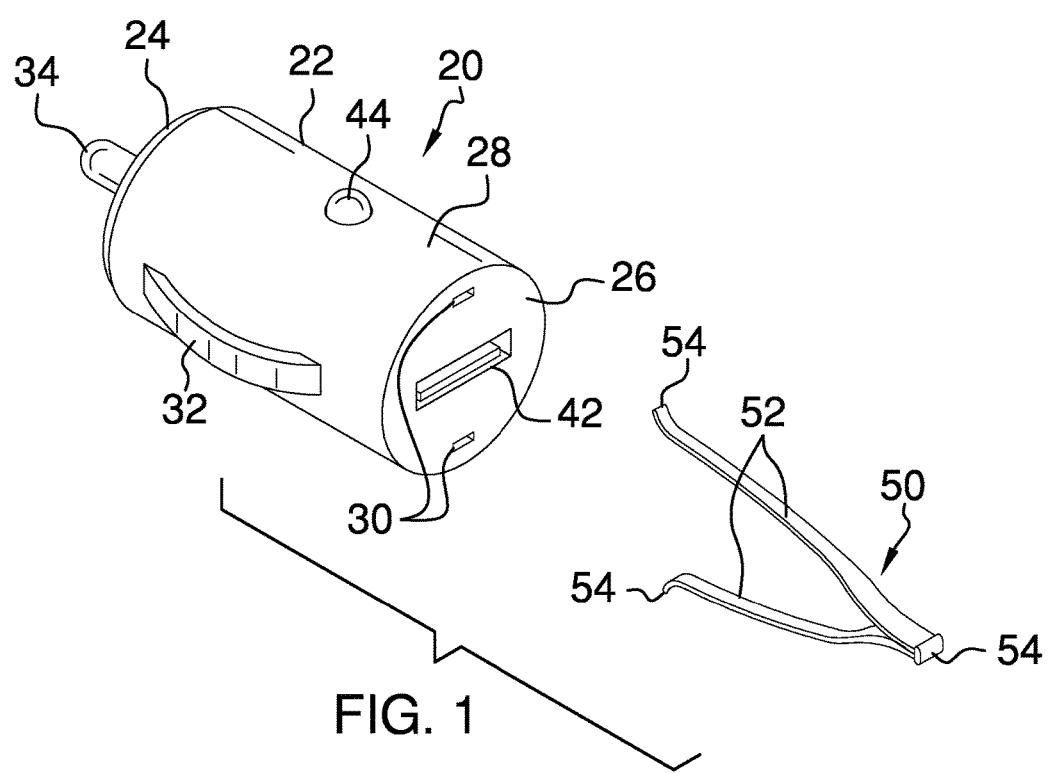
FIG. 1 is a perspective view of a vehicular safety system according to an embodiment of the disclosure.
Figure 2:
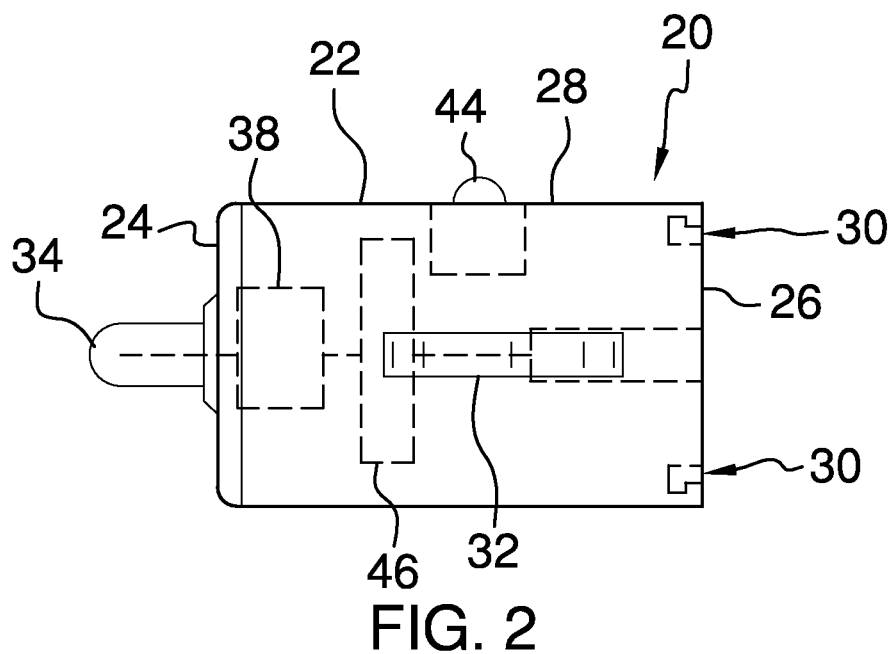
FIG. 2 is a right side view of an embodiment of the disclosure.
Figure 3:
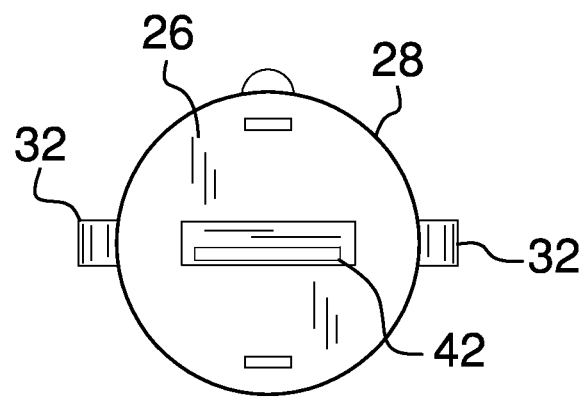
FIG. 3 is a back view of an embodiment of the disclosure.
Figure 4:
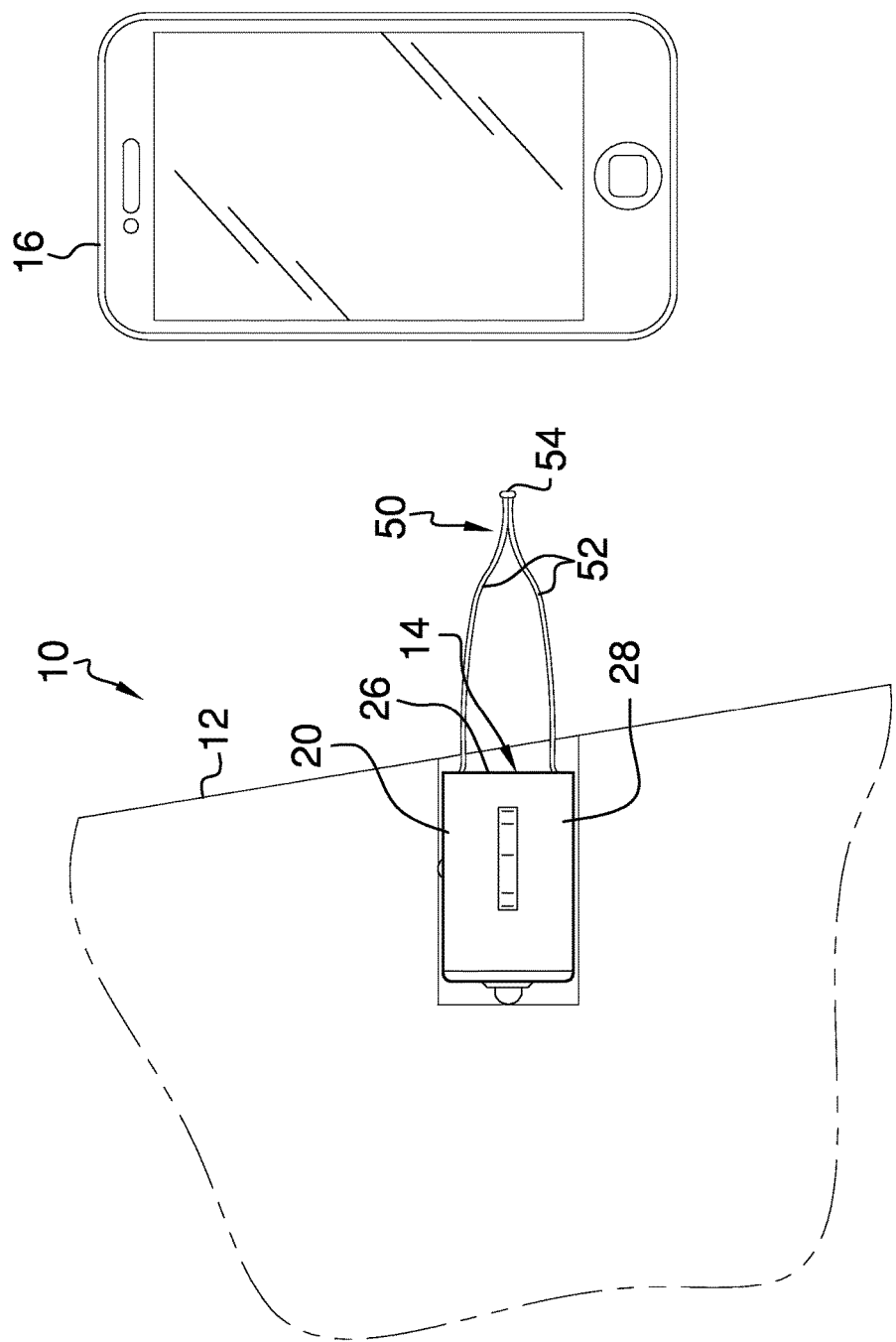
FIG. 4 is a perspective in-use view of an embodiment of the disclosure.
Figure 5:
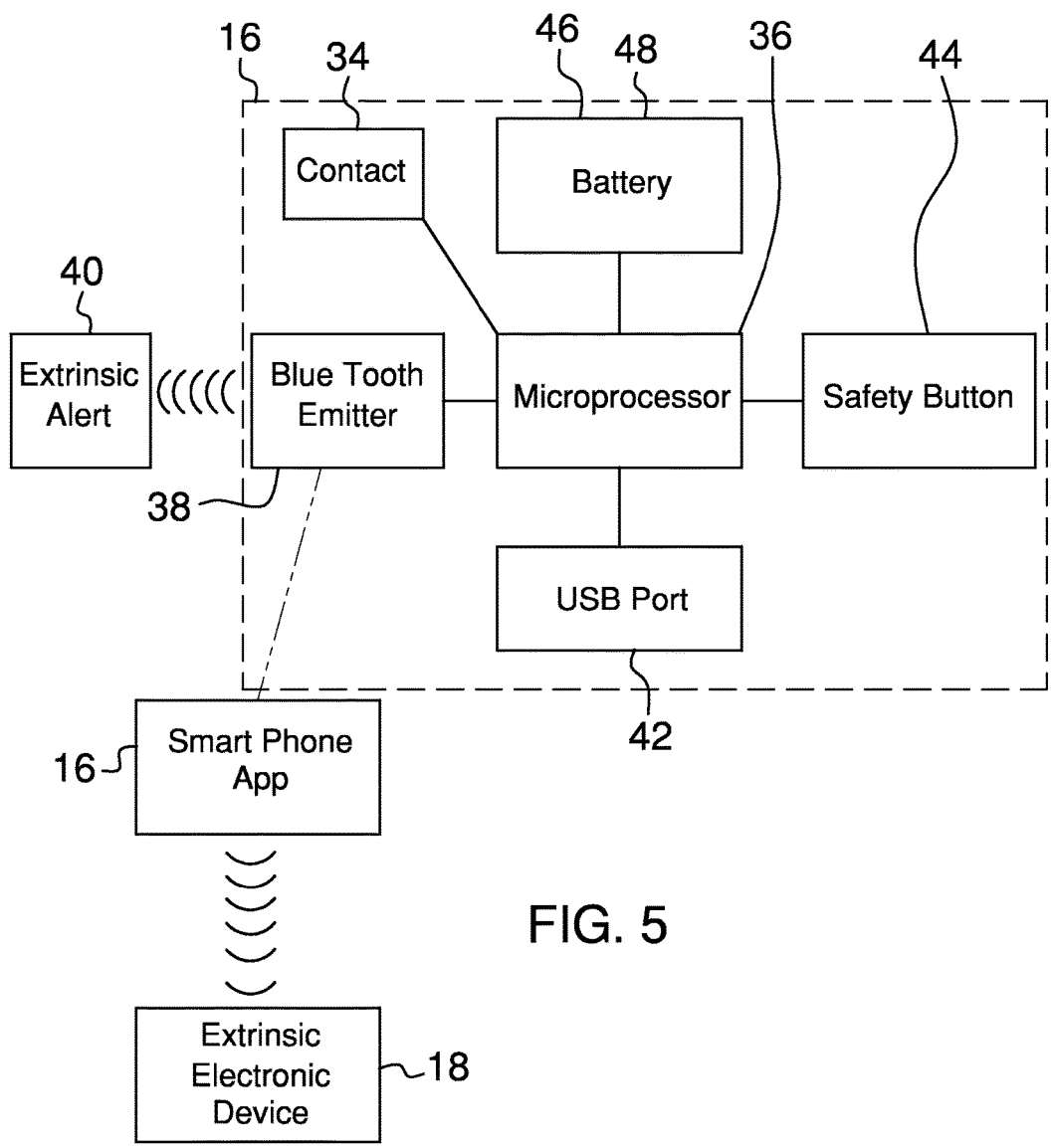
FIG. 5 is a schematic view of an embodiment of the disclosure.

With reference now to the drawings, and in particular to FIGS. 1 through 5 thereof, a new safety device embodying the principles and concepts of an embodiment of the disclosure and generally designated by the reference numeral 10 will be described.

As best illustrated in FIGS. 1 through 5, the vehicular safety system 10 generally comprises a vehicle 12 that has a power outlet 14. The vehicle 12 may be a passenger vehicle or the like and the power outlet 14 may comprise a cigarette lighter or the like. An electronic device 16 is provided and the electronic device 16 may in communication with an extrinsic communication network 18. The electronic device 16 may comprise a smart phone or the like and the electronic device 16 may be used for texting and for phone calls.

A locking unit 20 is removably positioned within the power outlet 14 such that the locking unit 20 determines when the vehicle 12 is turned on. The locking unit 20 is in communication with the electronic device 16. The locking unit 20 disables the electronic device 16 when the vehicle 12 is turned on while the electronic device 16 is within the vehicle 12. Thus, the electronic device 16 may not be utilized for texting or phone calls while the vehicle 12 is being driven.

The locking unit 20 comprises a housing 22 that has a front end 24, a back end 26 and a peripheral surface 28 extending between the front end 24 and the back end 26. The peripheral surface 28 is curved such that the housing 22 has a cylindrical shape and the housing 22 is removably positioned within the power outlet 14. The back end 26 has a pair of wells 30 extending inwardly therein and the wells 30 are spaced apart from each other. The back end 26 of the housing 22 is recessed within the power outlet 14 when the housing 22 is positioned within the power outlet 14.

A pair of biasing members 32 is each movably coupled to the peripheral surface 28. Each of the biasing members 32 is biased outwardly from the peripheral surface 28. Each of the biasing members 32 frictionally engages the power outlet 14 when the housing 22 is positioned within the power outlet 14. Thus, the housing 22 is removably retained within the power outlet 14.

A contact 34 is movably coupled to the housing 22 and the contact 34 is positioned on the front end 24. The contact 34 is biased to extend outwardly from the front end 24. The contact 34 is electrically coupled to the power outlet 14 when the housing 22 is positioned within the power outlet 14. A processor 36 is positioned within the housing 22 and the processor 36 is electrically coupled to the contact 34. The processor 36 may comprise an electronic processor or the like.

A transmitter 38 is positioned within the housing 22 and the transmitter 38 is electrically coupled to the processor 36. The transmitter 38 is in electrical communication with the electronic device 16 when the housing 22 is positioned within the power outlet 14. The transmitter 38 transmits a disable signal when the vehicle 12 is turned on. The electronic device 16 receives the disable signal such that the electronic device 16 is disabled while the vehicle 12 is turned on and the electronic device 16 is within the vehicle 12.

The transmitter 38 selectively transmits an alarm signal. The transmitter 38 may be in electrical communication with an extrinsic alert 40 thereby facilitating the extrinsic alert 40 to receive the alarm signal. The extrinsic alert 40 may comprise a smart phone or the like that is used to remotely monitor the activity of the electronic device 16 while the electronic device 16 is within the vehicle 12. The transmitter 38 may comprise a radio frequency transmitter or the like and the transmitter may utilize a WPAN signal.

A port 42 is positioned on the back end 26. The port 42 may be electrically coupled to a conductor 43. The port 42 is electrically coupled to the processor 36. The port 42 may comprise a usb port or the like.

A switch 44 is movably coupled to the peripheral surface 28 and the switch 44 is electrically coupled to the processor 36. The switch 44 engages the power outlet 14 when the housing 22 is positioned within the power outlet 14 such that the switch 44 is positioned in an on position. The switch 44 is biased into an off position when the housing 22 is removed from the power outlet 14. The switch 44 actuates the transmitter 38 to transmit the alarm signal when the switch 44 is biased into the off position. Thus, the transmitter 38 notifies the extrinsic alert 40 that the housing 22 has been removed from the power outlet 14 while the electronic device 16 is within the vehicle 12.

A power supply 46 is positioned within the housing 22. The power supply 46 is electrically coupled to the processor 36. The power supply 46 comprises at least one battery 48.

A removal tool 50 is provided and the removal tool 50 has a pair of arms 52 each extending away from a handle 53. The arms 52 are spaced apart from each other and each of the arms 52 has a distal end 54 with respect to the handle 53. The removal tool 50 may be manipulated having the distal end 54 of each of the arms 52 frictionally engaging an associated one of the wells 30. Thus, the removal tool 50 facilitates the housing 22 to be removed from the power outlet 14.

In use, the housing 22 is inserted into the power outlet 14 such that the back end 26 of the housing 22 is recessed within the power outlet 14. The electronic device 16 is synced with the transmitter 38 through any conventional wireless communication protocol. The transmitter 38 transmits the disable signal when the vehicle 12 is turned on. The electronic device 16 receives the disable signal if the electronic device 16 is within the vehicle 12. Thus, the electronic device 16 may not be utilized if the electronic device 16 is within the vehicle while the vehicle 12 is on. The extrinsic alert 40 is notified if the housing 22 is removed from the power outlet 14 while the vehicle 12 is on.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicular safety system comprising:
   a vehicle having a power outlet;
   an electronic device configured to be in communication with an extrinsic communication network; and
   a locking unit being removably positioned within said power outlet such that said locking unit determines when said vehicle is turned on, said locking unit being in communication with said electronic device such that said locking unit disables said electronic device when said vehicle is turned on while said electronic device is within said vehicle, wherein said locking unit comprises a housing having a front end, a back end and a peripheral surface extending between said front end and said back end, said peripheral surface being curved such that said housing has a cylindrical shape, said housing being removably positioned within said power outlet, said back end having a pair of wells extending inwardly therein, said wells being spaced apart from each other; and
   a removal tool having a pair of arms each extending away from a handle, said arms being spaced apart from each other, each of said arms having a distal end with respect to said handle, said removal tool being configured to be manipulated having said distal end of each of said arms frictionally engaging an associated one of said wells thereby facilitating said housing to be removed from said power outlet.

2. The system according to claim 1, further comprising a pair of biasing members, each of said biasing members being movably coupled to said peripheral surface, each of said biasing members being biased outwardly from said peripheral surface, each of said biasing members frictionally engaging said power outlet when said housing is positioned within said power outlet such that said housing is removably retained within said power outlet.

3. The system according to claim 1, further comprising a contact being movably coupled to said housing, said contact being positioned on said front end, said contact being biased to extend outwardly form said front end, said contact being electrically coupled to said power outlet when said housing is positioned within said power outlet.

4. The system according to claim 1, further comprising:
   a housing;
   a contact; and
   a processor being positioned within said housing, said processor being electrically coupled to said contact.

5. The system according to claim 4, further comprising a transmitter being positioned within said housing, said transmitter being electrically coupled to said processor, said transmitter being in electrical communication with said electronic device when said housing is positioned within said power outlet, said transmitter transmitting a disable signal when said vehicle is turned on, said electronic device receiving said disable signal such that said electronic device is disabled while said vehicle is turned on and said electronic device is within said vehicle, said transmitter selectively transmitting an alarm signal, said transmitter being configured to be in electrical communication with an extrinsic alert thereby facilitating said extrinsic alert to receive said alarm signal.

6. The system according to claim 4, further comprising:
   said housing having a back end; and
   a port being positioned on said back end wherein said port is configured to be electrically coupled to a conductor, said port being electrically coupled to said processor.

7. The system according to claim 4, further comprising a power supply being positioned within said housing, said power supply being electrically coupled to said processor, said power supply comprising at least one battery.

8. A vehicular safety system comprising:
   a vehicle having a power outlet;
   an electronic device configured to be in communication with an extrinsic communication network; and
   a locking unit being removably positioned within said power outlet such that said locking unit determines when said vehicle is turned on, said locking unit being in communication with said electronic device such that said locking unit disables said electronic device when said vehicle is turned on while said electronic device is within said vehicle;
   a housing, said housing having a peripheral surface;

a contact;
a processor being positioned within said housing, said processor being electrically coupled to said contact;
a transmitter being positioned within said housing, said transmitter being electrically coupled to said processor, said transmitter being in electrical communication with said electronic device when said housing is positioned within said power outlet, said transmitter transmitting a disable signal when said vehicle is turned on, said electronic device receiving said disable signal such that said electronic device is disabled while said vehicle is turned on and said electronic device is within said vehicle, said transmitter selectively transmitting an alarm signal, said transmitter being configured to be in electrical communication with an extrinsic alert thereby facilitating said extrinsic alert to receive said alarm signal; and
a switch being movably coupled to said peripheral surface, said switch being electrically coupled to said processor, said switch engaging said power outlet when said housing is positioned within said power port such that said switch is positioned in an on position, said switch being biased into an off position when said housing is removed from said power outlet, said switch actuating said transmitter to transmit said alarm signal when said switch is biased into said off position wherein said transmitter is configured to notify the extrinsic alert that said housing has been removed from said power outlet.

9. A vehicular safety system comprising:
a vehicle having a power outlet;
an electronic device configured to be in communication with an extrinsic communication network; and
a locking unit being removably positioned within said power outlet such that said locking unit determines when said vehicle is turned on, said locking unit being in communication with said electronic device such that said locking unit disables said electronic device when said vehicle is turned on while said electronic device is within said vehicle, said locking unit comprising:
  a housing having a front end, a back end and a peripheral surface extending between said front end and said back end, said peripheral surface being curved such that said housing has a cylindrical shape, said housing being removably positioned within said power outlet, said back end having a pair of wells extending inwardly therein, said wells being spaced apart from each other,
  a pair of biasing members, each of said biasing members being movably coupled to said peripheral surface, each of said biasing members being biased outwardly from said peripheral surface, each of said biasing members frictionally engaging said power outlet when said housing is positioned within said power outlet such that said housing is removably retained within said power outlet,
  a contact being movably coupled to said housing, said contact being positioned on said front end, said contact being biased to extend outwardly form said front end, said contact being electrically coupled to said power outlet when said housing is positioned within said power outlet,
  a processor being positioned within said housing, said processor being electrically coupled to said contact,
  a transmitter being positioned within said housing, said transmitter being electrically coupled to said processor, said transmitter being in electrical communication with said electronic device when said housing is positioned within said power outlet, said transmitter transmitting a disable signal when said vehicle is turned on, said electronic device receiving said disable signal such that said electronic device is disabled while said vehicle is turned on and said electronic device is within said vehicle, said transmitter selectively transmitting an alarm signal, said transmitter being configured to be in electrical communication with an extrinsic alert thereby facilitating said extrinsic alert to receive said alarm signal,
  a port being positioned on said back end wherein said port is configured to be electrically coupled to a conductor, said port being electrically coupled to said processor,
  a switch being movably coupled to said peripheral surface, said switch being electrically coupled to said processor, said switch engaging said power outlet when said housing is positioned within said power port such that said switch is positioned in an on position, said switch being biased into an off position when said housing is removed from said power outlet, said switch actuating said transmitter to transmit said alarm signal when said switch is biased into said off position wherein said transmitter is configured to notify the extrinsic alert that said housing has been removed from said power outlet, and
  a power supply being positioned within said housing, said power supply being electrically coupled to said processor, said power supply comprising at least one battery; and
a removal tool having a pair of arms each extending away from a handle, said arms being spaced apart from each other, each of said arms having a distal end with respect to said handle, said removal tool being configured to be manipulated having said distal end of each of said arms frictionally engaging an associated one of said wells thereby facilitating said housing to be removed from said power outlet.

* * * * *